UNITED STATES PATENT OFFICE.

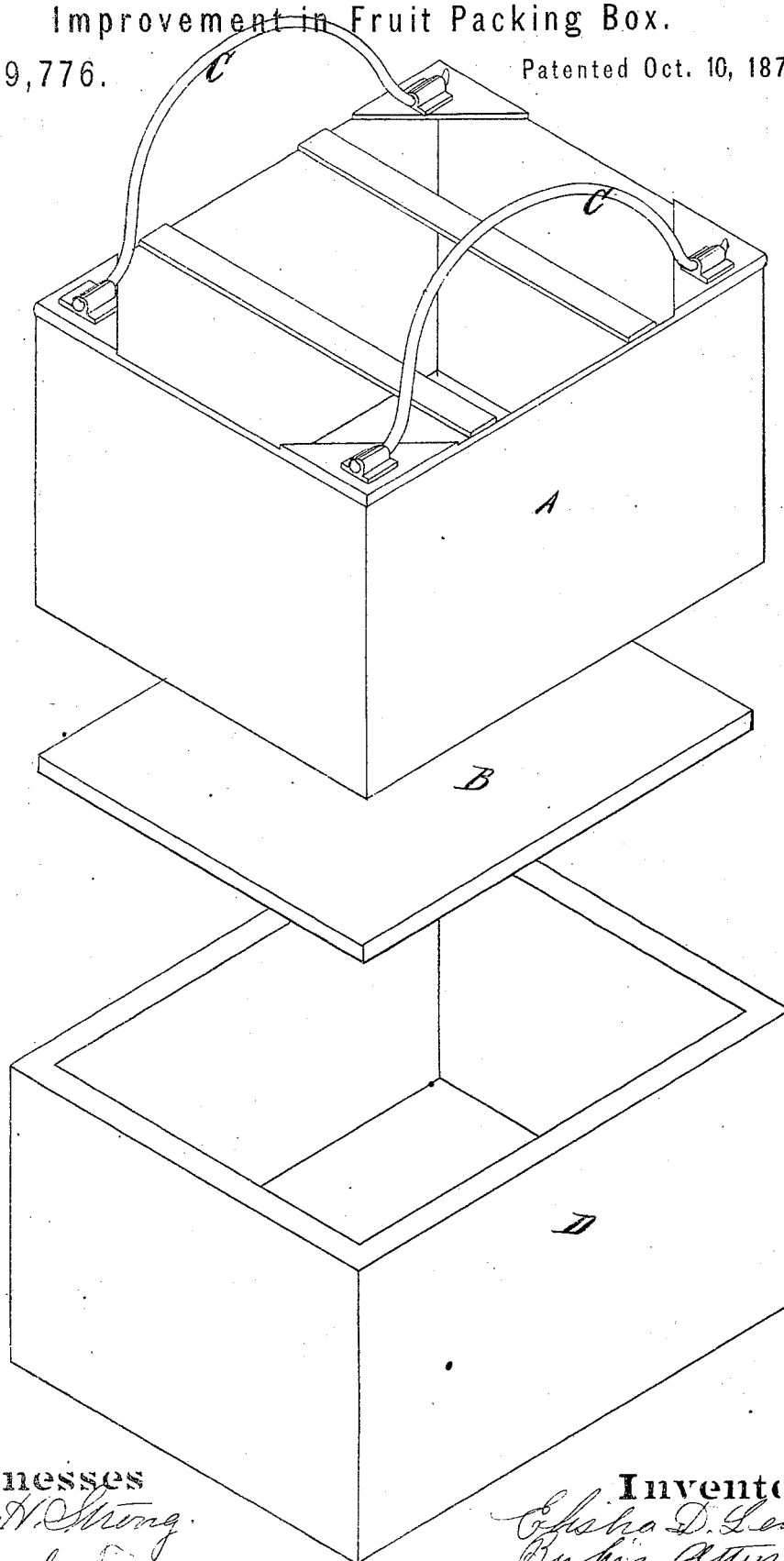

ELISHA D. LEWELLING, OF SAN LORENZO, CALIFORNIA.

IMPROVEMENT IN FRUIT PACKING-BOXES.

Specification forming part of Letters Patent No. 119,776, dated October 10, 1871.

*To all whom it may concern:*

Be it known that I, ELISHA D. LEWELLING, of San Lorenzo, county of Alameda, State of California, have invented an Improved Fruit Packing-Box; and I do hereby declare the following description and accompanying drawing are sufficient to enable any person skilled in the art or science to which it most nearly appertains to make and use my said invention or improvements without further invention or experiment.

My invention relates to an improved device for packing fruit, and is applicable more particularly for packing cherries and other small fruit which are packed for market on the stem.

In packing this kind of fruit it is desirable to place it in the box with the stems down, so that as each layer is removed the fruit of the layer below will be exposed and not the stems. This it is almost impossible to do neatly when the fruit is packed directly into the box in which it is to go to market.

My packing device consists of a supplementary packing-box, into which the fruit is first packed with the stems up. From this box the fruit is then transferred to the box in which it is to be carried to market.

In order to more fully illustrate and explain my invention, reference is had to the accompanying drawing forming a part of this specification, in which—

A represents a box, which may be made of any light and strong material. The bottom of this box may be a skeleton, as shown in the drawing, and employ a loose false bottom, B, which I place upon the skeleton bottom for the purpose hereinafter described. Upon this bottom, outside of the box, I secure one or more bales and handles C, which serve to lift the box when desired. D represents any fruit-box which it may be desired to pack with cherries or other small fruit in order to place it in the market. The box A should be made of a proper size to slide down inside of the box D when turned upside down. In order to pack the box D I first take the box A and place the false bottom B upon the skeleton bottom; I then proceed to pack the cherries or other fruit in this box with the stems up until it has been completely filled. The box D is then taken up and turned upside down and slipped down over the box A until the last layer of cherries laid in the box A rests upon the bottom of box D. Both boxes are then turned over and the box A withdrawn by means of the bales or handles C, leaving the cherries or other fruit nicely packed in the box D with the stems down. By leaving the bottom of the box A open air is admitted to the bottom, so as to prevent a vacuum from forming when the fruit is dropped out, which would otherwise cause the fruit to cling at the sides and be disarranged in being transferred from one box to the other.

Having thus described my invention, what I claim, and desire to secure by Letters Patent, is—

The supplementary packing-box A, having a skeleton or open bottom, and provided with bales or handles C, in combination with the false bottom B and fruit-box D, substantially as and for the purpose above described.

In witness that the above-described invention is claimed by me I have hereunto set my hand and seal.

ELISHA D. LEWELLING. [L. S.]

Witnesses:
   A. T. DEWEY,
   JOHN L. BOONE.